United States Patent [19]

Ogaki et al.

[11] Patent Number: 4,654,799

[45] Date of Patent: Mar. 31, 1987

[54] SOFTWARE VENDING SYSTEM

[75] Inventors: Hirokazu Ogaki; Yoshibumi Kato, both of Nagoya; Satoshi Furukawa, Suzuka, all of Japan

[73] Assignee: Brother Kogyo Kabushiki Kaisha, Aichi, Japan

[21] Appl. No.: 734,162

[22] Filed: May 15, 1985

[30] Foreign Application Priority Data

May 18, 1984 [JP] Japan ................................ 59-101388

[51] Int. Cl.[4] ........................ G06F 15/20; G06F 15/44

[52] U.S. Cl. ........................................ 364/479; 360/15; 364/410; 364/900

[58] Field of Search ............... 364/410, 479, 401, 403, 364/404, 405, 408, 200 MS File, 900 MS File; 360/15; 369/84, 85; 235/379, 380, 381; 273/85 G, DIG. 28, 1 E

[56] References Cited

U.S. PATENT DOCUMENTS

| | | | |
|---|---|---|---|
| 3,718,906 | 2/1973 | Lightner | 360/15 X |
| 3,990,710 | 11/1976 | Hughes | 360/15 X |
| 4,141,045 | 2/1979 | Sheehan | 360/92 X |
| 4,227,220 | 10/1980 | Brown | 360/15 X |
| 4,240,120 | 12/1980 | Padwa | 360/15 |
| 4,414,467 | 11/1983 | Gould | 235/379 X |
| 4,593,376 | 6/1986 | Volk | 364/479 |
| 4,597,058 | 6/1986 | Izumi et al. | 364/900 |

FOREIGN PATENT DOCUMENTS

| | | | |
|---|---|---|---|
| 0096465 | 12/1983 | European Pat. Off. | 360/15 |
| 2013865 | 2/1983 | United Kingdom | 360/15 |

*Primary Examiner*—Joseph Ruggiero

*Attorney, Agent, or Firm*—Parkhurst & Oliff

[57] ABSTRACT

A software vending system comprising a host system including a first memory for storing a plurality of first software programs and a plurality of peripheral vending instruments operatively connected to the host system for interactive data communication, each peripheral vending instrument including a secondary memory for storing the first software programs transferred from the first memory of the host system, and a recording device for duplicating in a recordinng medium a selected one of the first software programs stored in the secondary memory. The peripheral vending instrument further includes an input device for entering a second software program into the vending instrument, and a data transmitting device for transferring to the host system the second software program entered through the input device. The host system includes a data receiving device for receiving the second software program transferred from the data transmitting device of the peripheral vending instrument, and further includes a second memory for storing the second software program received by the data receiving device.

10 Claims, 9 Drawing Figures

SOFTWARE VENDING SYSTEM

BACKGROUND OF THE INVENTION

1. Field of the Art

The present invention relates to a software vending system including a host system and a plurality of peripheral vending machines or instruments.

2. Related Art Statement

In recent years, a variety of software programs for video games, and visual or audiovisual software programs for business and educational purposes are marketed and sold on a large scale. The assignee of the present application developed a software vending instrument and a software vending system as disclosed in U.S. patent applications, Ser. Nos. 608,551 filed May 8, 1984 and 614,664 filed May 29, 1984. In such vending instrument or system, various software programs prepared by a software supplier or distributor are stored in a memory of each peripheral vending instrument located at a software dealer, or such programs are transferred from a central host system to the peripheral vending instruments. The purchaser selects a desired software program at the local vending instrument and duplicates the program in a blank tape cassette or other suitable recording medium supplied by the instrument. In this arrangement, the software dealer does not have to keep a large number of recorded tape cassettes, and watch for optimum stock of the cassettes of the different programs. Thus, the vending instrument or system as disclosed in the above-identified applications has freed the software suppliers and dealers from a cumbersome inventroy control of software packages, i.e., recording media which store various software programs.

While such software programs have been developed or designed by software suppliers, there is an increasing number of software maniacs or amateur fans who are interested in developing new software programs by themselves. When they wish to market the software programs of their own design, they duplicate the programs in tape cassettes and mail the cassettes to a software supplier or distributor, who evaluates the programs for possibility of sale on their network.

SUMMARY OF THE INVENTION

It is accordingly an object of the present invention to provide a software vending system which is not only capable of vending various software programs by means of duplication thereof in a suitable recording medium at local peripheral vending instruments, but also permits the users of the instruments or general public to transmit their newly developed software programs to a central host system at a software supplier or distributor, so that the programs of their own design may be readily evaluated by the supplier or distributor for possibility of sale on the market.

According to the invention, there is provided a software vending system comprising a host system including first memory means for storing a plurality of different first software programs, and a plurality of peripheral vending instruments or machines each operatively connected to the host system for interactive data communication therebetween. Each of the peripheral vending instruments includes secondary memory means for storing the first software programs which have been transferred from the first memory means of the host system, and recording means for duplicating in a suitable recording medium a selected one of the first software programs stored in the secondary memory means. Each peripheral vending isntrument further includes an input device for entering a second software program into the vending instrument, and data transmitting means for transferring to the host system said second software program which is entered through the input device. The host system includes data receivingmeans for receiving said second software program which is transferred from the data transmitting means of each peripheral vending instrument. The host system further includes second memory means for storing said second software program received by the data receiving means.

In the software vending system constructed according to the invention as described above, a software program which has been developed or designed by a software maniac or any other person may be transferred from the nearest peripheral vending instrument at a local software dealer, to the host system at a software supplier or distributor who delivers the software programs through their peripheral vending instruments. The transfer of the program to the host system may be made by simply entering the developed program into the peripheral vending instrument through its input device. The entered program is transmitted to the host system by means of the data transmitting means provided on the vending instrument. Consequently, the persons who have designed new software programs are no more required to mail or hand-carry program-loaded tape cassettes or flopply disks to the software supplier or distributor.

The programs transferred from the individual local vending instruments are received by the data receiving means of the host system, and then stored in the second memory means. Hence, various software programs prepared by amateur program designers may be easily collected at the software supplier or distributor, and considered or evaluated for possibility of sale on the market.

The input device provided on each peripheral vending instrument may comprise a tape cassette playback device for reading said second program in a tape cassette, or a floppy disk drive for reading the program in a floppy disk. Preferably, both of these data reading devices are provided on the vending instrument.

Each peripheral vending instrument may comprise a central processing unit which serves as the data transmitting means. It is possible that the central processing unit be adapted to store in a memory said second software program which have been entered through the input device. The secondary memory may be used as the memory for storing the second software program.

The peripheral vending instrument may be provided with a switch connected to the central processing unit described above. In this case, the data transmitting means transfers said second software program to the data receiving means of the host system, in respose to the operation of the switch, if said second program has been entered through the input device and stored in the memory.

BRIEF DESCRIPTION OF THE DRAWINGS

In the accompanying drawing, there is shown an illustrative embodiment of the present invention, from which the foregoing and other objects, features and advantages of the invention will be readily apparent. In the drawing.

DETAILED DESCRIPTION OF THE PREFERRED EMBODIMENT

Figure 1:
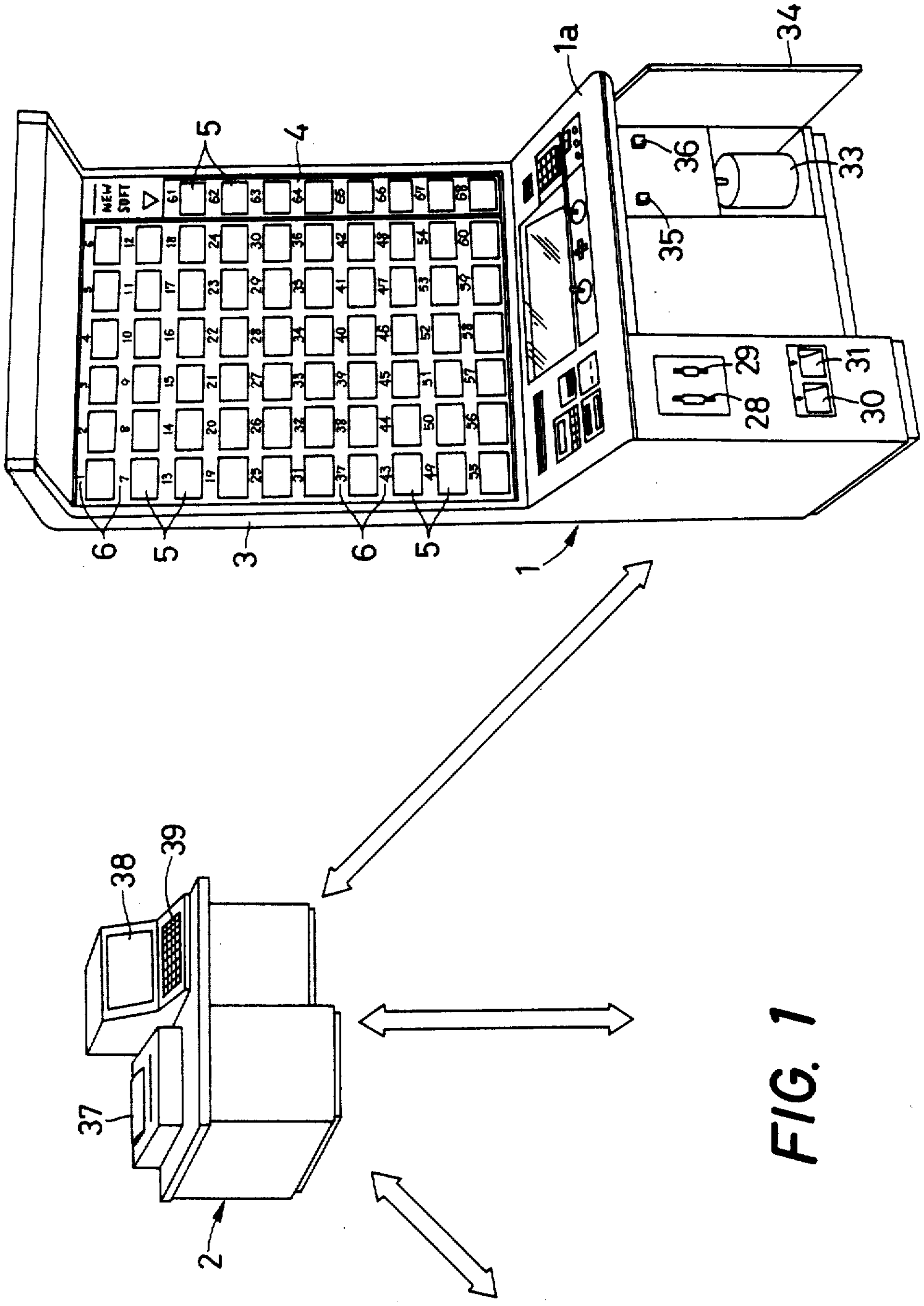
FIGS. 1A and 1B are a perspective view of one embodiment of software vending system of this invention.

Referring first to FIG. 1, there is shown a preferred form of a software vending system which comprises a plurality of peripheral vending machines or instruments 1 installed at local software dealers, and a host system 2 located at a software supplier or distributor. The peripheral vending instruments 1 are operatively connected via a private communication line to the host system 2, to permit on-line interactive data communication therebetween.

Each of the peripheral vending instruments 1 comprises a control console or table 1*a* on which are provided various control keys and switches, and other devices used to operate the vending instrument 1, as described later in detail. At the rear of this control table 1*a*, there is provided a display or exhibition device 3 which stands upright. The exhibition device 3 comprises a display panel 4 carrying a host of representations 5 which are disposed in plural rows. Each representation 5 consists of a title of a software program and an animated-cartoon or pictorial or illustrative image showing the contents or subject matter of the corresponding program. The individual programs indicated by the respective representations 5 are numbered by Serial-No. indicia 6 disposed right above the corresponding representations 5. The software programs are classified into three groups, that is: GAME programs for video games; BUSINESS programs for business purposes; and EDUCATIONAL programs for educational purposes. The exhibition device 3 includes program indicator lights 7 (FIG. 4) provided inside of the display panel 4, so as to illuminate the respective indicia 6. These indicator lights 7 are operated under the control of a first central processing unit 44 which will be described.

Figure 2:
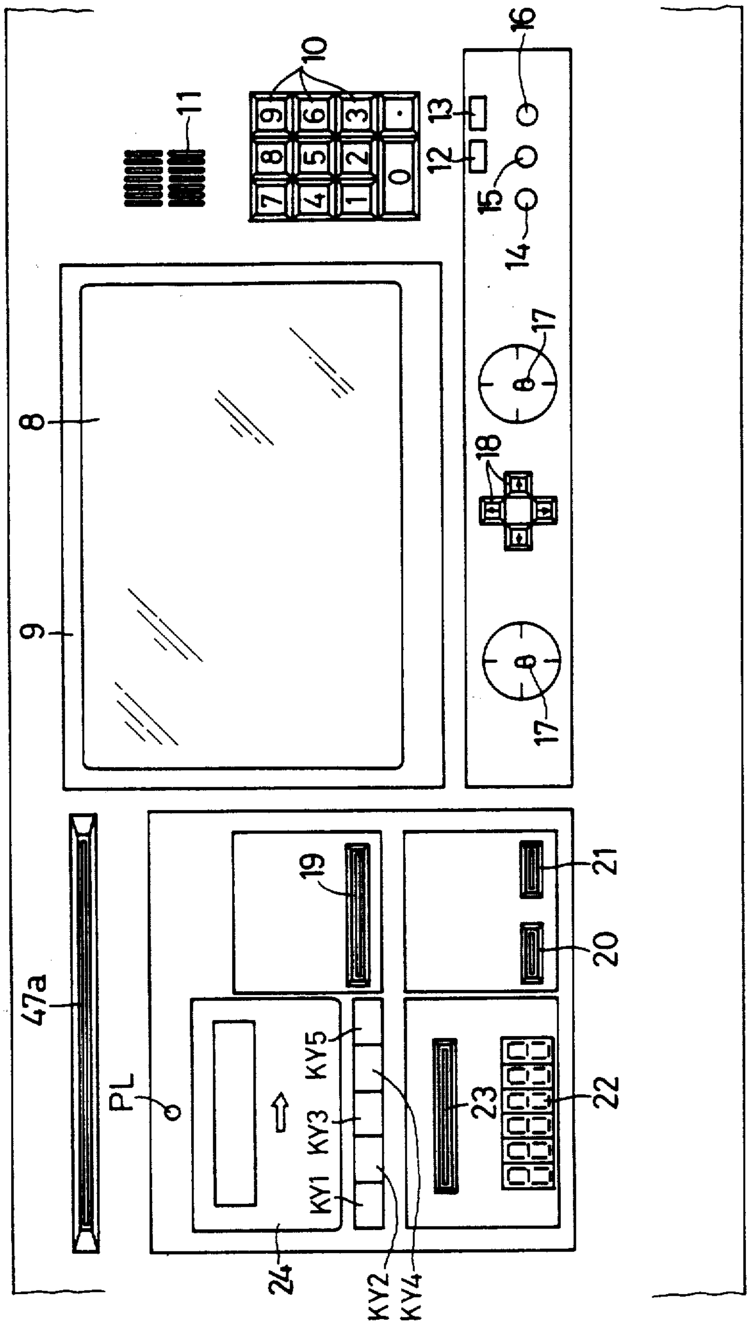
FIG. 2 is a fragmentary plan view of a control table of a peripheral vending instrument of the vending system of FIG. 1.

As illustrated in FIG. 2, the control table 1a has a cathode ray tube 8 (hereinafter referred to as "CRT 8") having a screen which is covered by a transparent glass plate 9. This CRT 8 provides messages to a purchaser, displays the contents of each program on sale, and provides a brief demonstration of the program. The control table 1a further has numeric Ten-keys 10 disposed to the right of the CRT 8 to select a desired one of the software programs with their serial numbers (identified by the indicia 6). As described later in greater detail, these Ten-keys 10 are used when newly developed software programs are entered into the vending instrument 1 by the users of the instrument. At the back of the numeric Ten-keys 10 is a speaker 11 which is adapted to generate sounds of video games, operation alarm sounds, etc.

In front of the Ten-keys 10, there are disposed a START key 12 to execute the selection of a program which has been designated by the Ten-keys 10, and a RESET key 13 which is used to cancel a program which has been selected by depression of the START key 12. Three selector switches are provided in front of the START and RESET keys 12, 13: a GAME selector key 14; a BUSINESS selector key 15; and an EDUCATIONAL selector key 16. These selector keys 14, 15 and 16 are used to designate one of the three groups of software programs, that is, GAME, BUSINESS and EDUCATIONAL.

In front of the CRT 8, there are disposed a pair of joy stick switches 17 and four jog keys 18 located between the switches 17. These switches and keys 17, 18 are used to interact with a selected program when it is executed on the CRT 8, or influence the execution of the program, in particular, to participate in a game which is animated by the selected program executed on the CRT 8. In other words, the manipulation of the switches 17 and keys 18 will affect visual images provided on the CRT 8 during execution of the program.

To the left of the CRT 8, there are provided cash-depositing means: a paper-money inlet 19 through which a 1000-yen bill is inserted into the instrument 1; a 100-yen coin slot 20 through which a 100-yen coin is deposited; and a 10-yen coin slot 21 for depositing a 10-yen coin. An indicator 22 disposed to the left of the 100-yen coin slot 20 indicates the sum of money deposited through the paper-money inlet 19 and the 100-yen and 10-yen coin slots 20, 21. The indicator 22 further indicates the serial number of a program selected by the Ten-keys 10, and other information.

At the back of the indicator 22 is disposed a receipt exit 23 through which are fed out a receipt and a sales record sheet that are printed by a receipt printer 56 which will be described. The sales record sheet contains a record of sales of the individual software programs.

Figure 3:
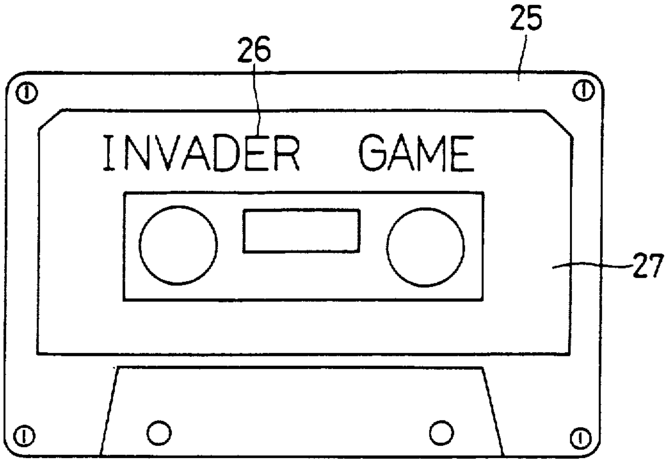
FIG. 3 is a front elevational view of a tape cassette used for the vending instrument.

The control table 1a is further provided, at the back of the receipt exit 23, with a tape cassette recording/-playback device 24 which is adapted to be loaded with a tape cassette 25 as illustrated in FIG. 3. The recording/playback device 24 is used by the purchaser to inspect or verify a program bought by the purchaser, or by the user of the instrument 1 to enter a program developed by the user (software maniac or amateur fan) into a hard disk memory 33 (which will be described) incorporated in the vending instrument 1. The device 24 is operated through manipulation of a REWIND key KY1, a STOP key KY2, a PLAY key KY3, a FAST FORWARD key KY4 and a RECORDING key KY5, which are all disposed on the front side of the recording/playback device 24. The transfer of a user-developed program into the hard disk memory 33 is accomplished by operating the Ten-keys 10 in a predetermined manner.

An indicator light PL is disposed on the rear side of the tape cassette recording/playback device 24. This indicator light PL is illuminated while a selected program is being duplicated into a recording medium in the form of the tape cassette 25. The blank or non-recorded tape cassette 25 is stored in the vending instrument 1 in large quantities. It is noted that each of the blank or non-recorded tape cassette 25 is stored in the instrument 1 without a label 27 (shown in FIG. 3) stuck to its front face. This label 27 carries an imprint 26 which represents the title of a program recorded in the tape cassette 25, to identify the program. Blank sheets for the label 27 are stored in the instrument 1, and each blank sheet is printed by a label printer 48, in order to provide the label 27 with the imprint 26. The label 27 is supplied to the purchaser so that it is bonded to the recorded tape cassette 25 with an adhesive on one side of the label 27.

At the back of the indicator light PL, an exit *47a* through which is fed out an instruction sheet for the purchased software program. This sheet is printed by an instruction-sheet printer 47 which will be described.

On a lower front left-hand side part of the vending instrument 1, there are disposed two floppy disk drives 28, 29 which accommodate two different sizes of floppy disks. These floppy disk drives 28, 29 are used when a program developed by the user of the instrument 1 is transferred from a floppy disk into the hard disk memory 33. The transfer of the program is achieved by operating the Ten-keys 10 in a predetermined manner.

Below the floppy disk drives 28, 29 are provided a cassette tray 30 and a change tray 31. The cassette tray 30 receives the recorded tape cassette 25 and the printed label 27, while the change tray 27 receives a change when the amount of money deposited through the inlet 19 and the coin slots 20, 21 exceeds a selling price of a program duplicated in the tape cassette 25 (price of the program bought by the purchaser).

The hard disk memory 33, which serves as secondary memory means, is accommodated within a housing of the instrument 1 which comprises a front door 34 equipped with a lock. The door 34 can be opened only by an authorized person or persons having a key for the lock. The hard disk memory 33 has memory areas for storing: the software programs which are exhibited on the display panel 4, and printing data used to print the labels 27 (label data representative of the imprints 26 to be printed on the labels 27) and printing data to print instruction sheets of the programs; price data indicative of selling prices of the programs; and sales record data representing the sales records of the individual programs, including the date of sale (year, month and day).

The hard disk memory 33 further has memory areas for storing: user-developed programs entered through the recording/playback device 24, or flopply disk drives 28, 29, and related data indicative of names of the persons who designed the programs; technical information or commercial news delivered from the host system 2 to the software dealers who own or manage the vending instruments 1; and maintenance data which are records of program-duplication errors, mechanical and electrical defects or failures of the vending instrument 1, and numbers of these operational troubles which have occurred.

In the previously indicated housing, there are disposed a SALES RECORD switch 35 and a MAINTENANCE switch 36, which are accessible by opening the front door 34. The SALES RECORD siwtch 35 is used when it is desired to know the amounts of sales of the individual programs on sale (stored in the hard disk memory 33). The MAINTENANCE switch 36 is used when it is desired to transfer the following data from the hard disk memory 33 to the host system 2: sales record data of the individual programs; user-developed programs stored in the hard disk memory 33 via the device 24 or floppy disk drives 28, 29, and the related data indicative of the names of the programmers; and maintenance data indicative of the operational troubles such as program-duplication errors and their number of occurrences. The MAINTENANCE switch 36 is also used when the vending instrument 1 receives information or data from the host system 2.

The host system 2 is provided with a printer 37, a CRT 38 and a keyboard 39. The printer 37 is used to produce printouts of the above-indicated sales records, maintenance data, and user-developed programs which are transmitted from the individual peripheral vending instruments 1. The CRT 8 displays these data.

Figure 4A:
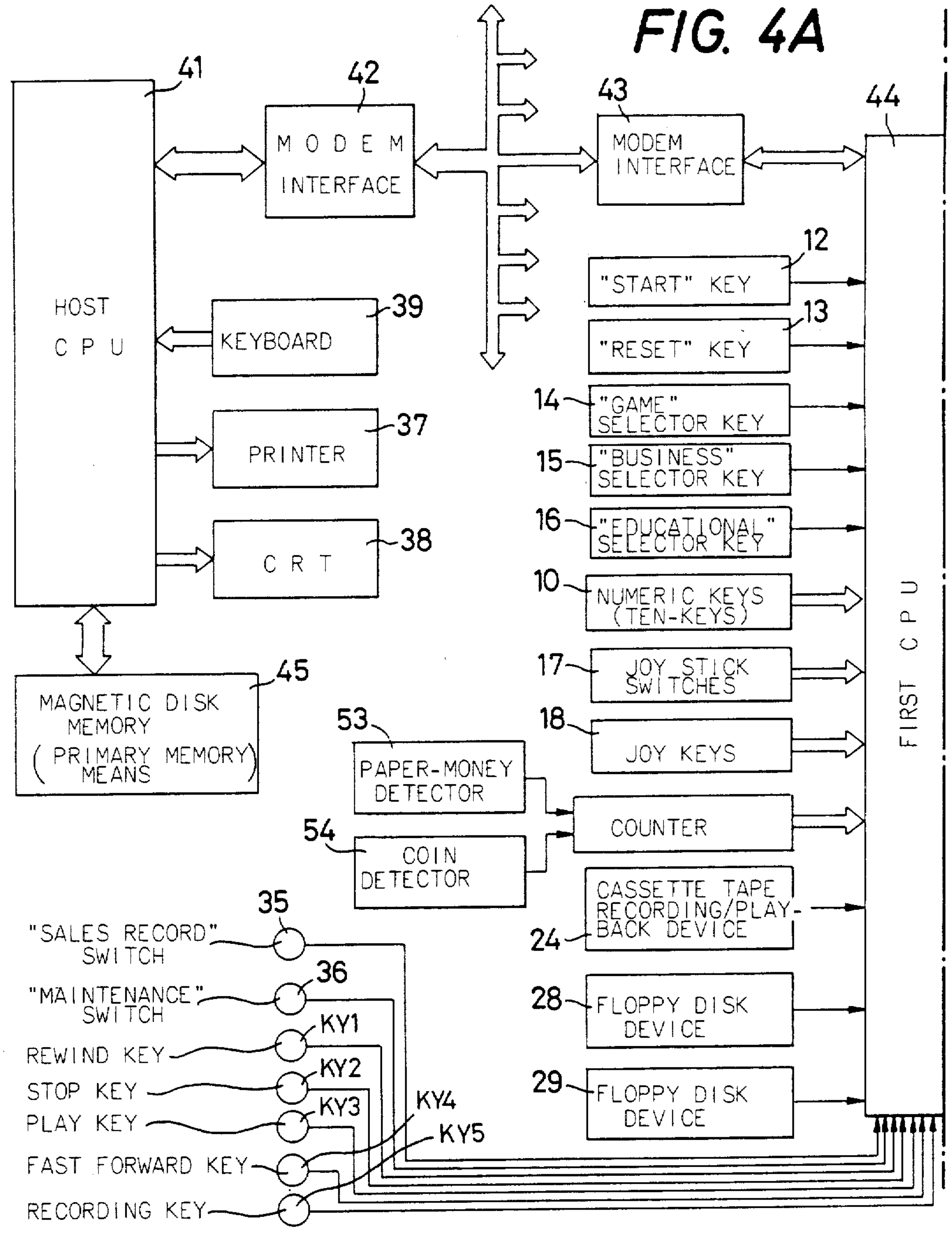
FIGS. 4A and 4B constitute a schematic block diagram of a control arrangement of the vending system.
Figure 4B:
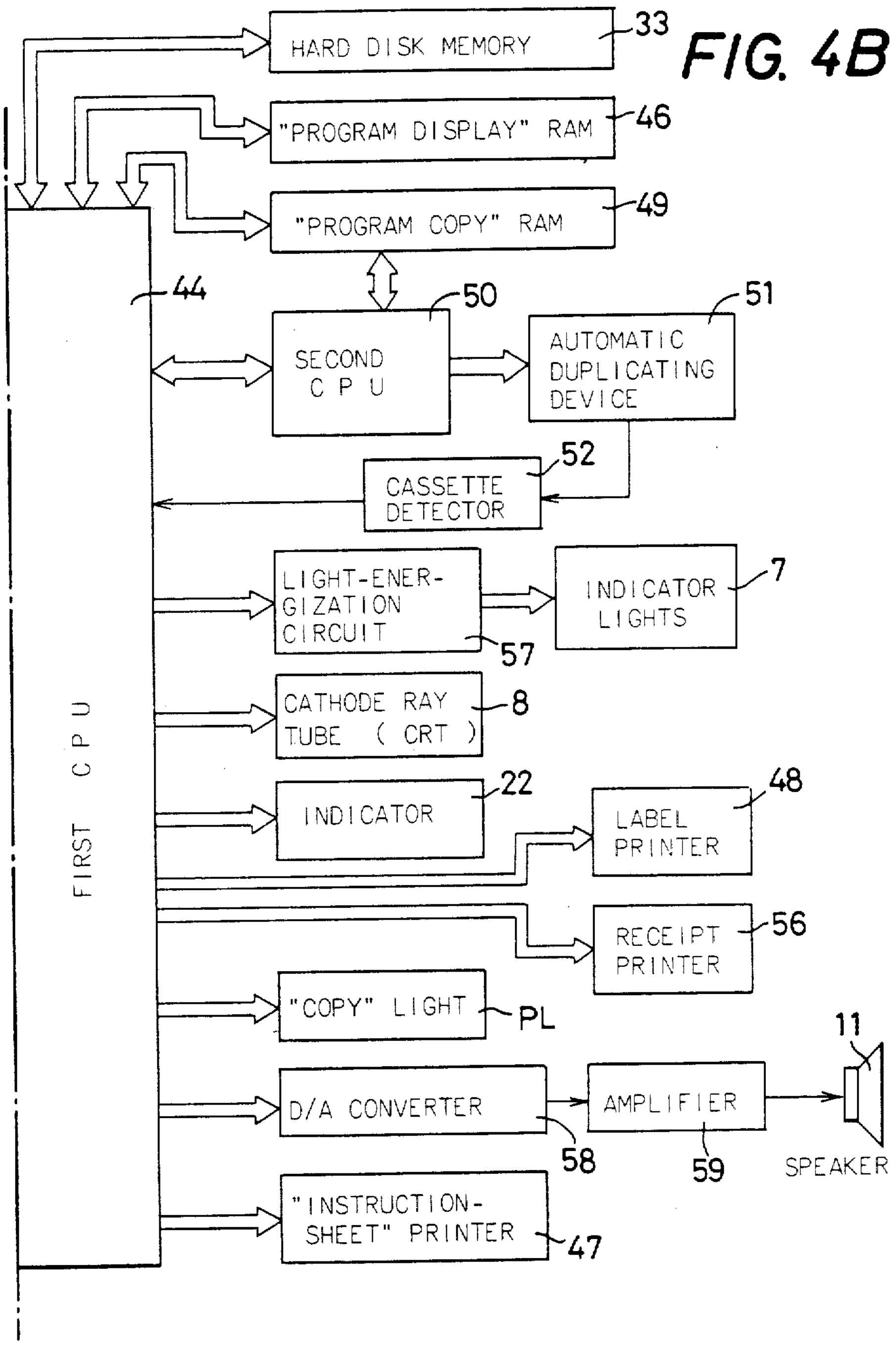

Referring next to FIGS. 4A & 4B, a control arrangement of the software vending system of the invention will be described.

In the figure, the host system 2 comprises a central processing unit 41 (hereinafter referred to as "host CPU 41") which serves as means for transmitting and receiving data to and from the peripheral vending instruments 1. The host CPU 41 is connected a first central processing unit 44 (hereinafter referred to as "first CPU 44") of each peripheral vending instrument 1 at a local dealer, through a MODEM interface 42 of the host system 2, a MODEM interface 43 of the instrument 1, and a private or exclusive data communication lne connecting the MODEM interfaces 42 and 43. The first CPU 44 serves as means for transmitting and receiving data to and from the host system 2. Thus, interactive data communication between the host system 2 and the peripheral vending instruments 1 can be effected through the host CPU 41 and the first CPU 44.

The host system 2 incorporates a magnetic disk memory 45 which serves as first and second memory means. As the first memory means, the magnetic disk memory 45 has memory areas for storing: source programs corresponding to the programs which are exhibited on the display panel 4; printing data used to print the labels 27 and instruction sheets of the programs; price data indicative of selling prices of the programs; and technical information or commercial news delivered from the host system 2 to the software dealers. As the second memory means, the disk memory 45 further has memory areas for storing the previously indicated data which are transferred from the peripheral vending instruments 1, such as: sales record data representing the sales records of the individual programs; user-developed programs and the related data; and maintenance data.

The first CPU 44 of the peripheral vending instrument 1 receives, from the magnetic disk memory 45 via the host CPU 41, the software programs for sale, the printing data to print the labels 27 and instruction sheets for the programs, the price data, and the technical or commercial information or news, and stores these data in appropriate memory areas of the hard disk memory 33. In the meantime, the first CPU 44 transmits to the host CPU 41 the user-developed programs, sales record data and maintenance data.

When a desired software program stored in the hard disk memory 33 is designated by the selector switches 14–16 and the Ten-keys 10, the first CPU 44 transfers the designated software program and the related data for printing its label 27 and instruction sheet, from the hard disk memory 33 to a PROGRAM DISPLAY RAM 46 which is a random-access memory connected to the first CPU 44.

Based on the software program stored in the PROGRAM DISPLAY RAM 46, the first CPU 44 executes the program on the CRT 8, that is, causes the CRT 8 to display the contents of the program, e.g., play a video game if the selected program is a video game program. At the same time, the first CPU 44 operates the instruction-sheet printer 47 the print necessary information on a sheet of paper and thus prepare an instruction sheet for the selected program, according to the data for printing the instruction sheet. In the meantime, the first CPU 44 operates the label printer 48 to print the imprint 26 on a sheet of paper to prepare the label 27 for the program, according to the label printing data. The printed instruction sheet and label 27 are delivered through the exits 47*a* and 30, respectively.

Another random-access memory is provided as a PROGRAM COPY RAM 49. When the designated software program is transferred from the hard disk memory 33 to the PROGRAM DISPLAY RAM 46, the same program is also transferred to the PROGRAM COPY RAM 49 for temporary storage therein. The designated program stored in the PROGRAM COPY RAM 49 is retrieved by a second central processing unit 50 (hereinafter called "second CPU").

With the designated program transferred to the PROGRAM COPY RAM 49, the second CPU 50 operates an automatic duplicating device 51 incorporated in the instrument, so that the designated program is copied or duplicated in the blank tape cassette 25. Stated more specifically, the duplicating device 51 records a duplicate program in one of the blank tape cassettes 25 stored in the instrument 1, based on signals from the second CPU 50. After completion of the program loading into the tape cassette 25, the tape is rewound and the recorded cassette 25 is ejected to the cassette tray 31.

A cassette detector 52 is provided to check if the blank tape cassette 25 to be supplied to the duplicating device 51 is in stock or not. The cassette detector 52 generates a signal when the blank tape cassette 25 has become out of stock, and the signal is fed to the first CPU 44.

A paper-money detector 53 and a coin detector 54 are provided to detect bills (paper-money) and coins deposited through the paper-money inlet 19 and the coin slots 20, 21. Signals from these detectors 47, 48 are applied to a counter 55 which counts the sum of the deposited money, and feeds "deposit" data to the first CPU 44. Based on the "deposit" data, the first CPU 44 causes the indicator 22 to display the sum of the deposited money, and operates the receipt printer 56 to print a receipt which indicates the sum of the money deposited, a selling price of the designated software program, and an amount of the change.

The first CPU 44 controls a light energization circuit 57 which energizes a group of the program indicator lights 7 corresponding to the group of programs selected by the GAME, BUSINESS and EDUCATIONAL selector switches 14–16, and effects a flickering or blinking action of the particular one of the indicator lights 7 which corresponds to the program designated by the Ten-keys 10.

A D/A converter 58 is connected to the first CPU 44 to convert a digital control signal from the first CPU 44 into an analog signal which is amplified by an amplifier 59 and applied to the speaker 11, so that the speaker 11 generates video game sounds and alarm sounds.

Figure 5:
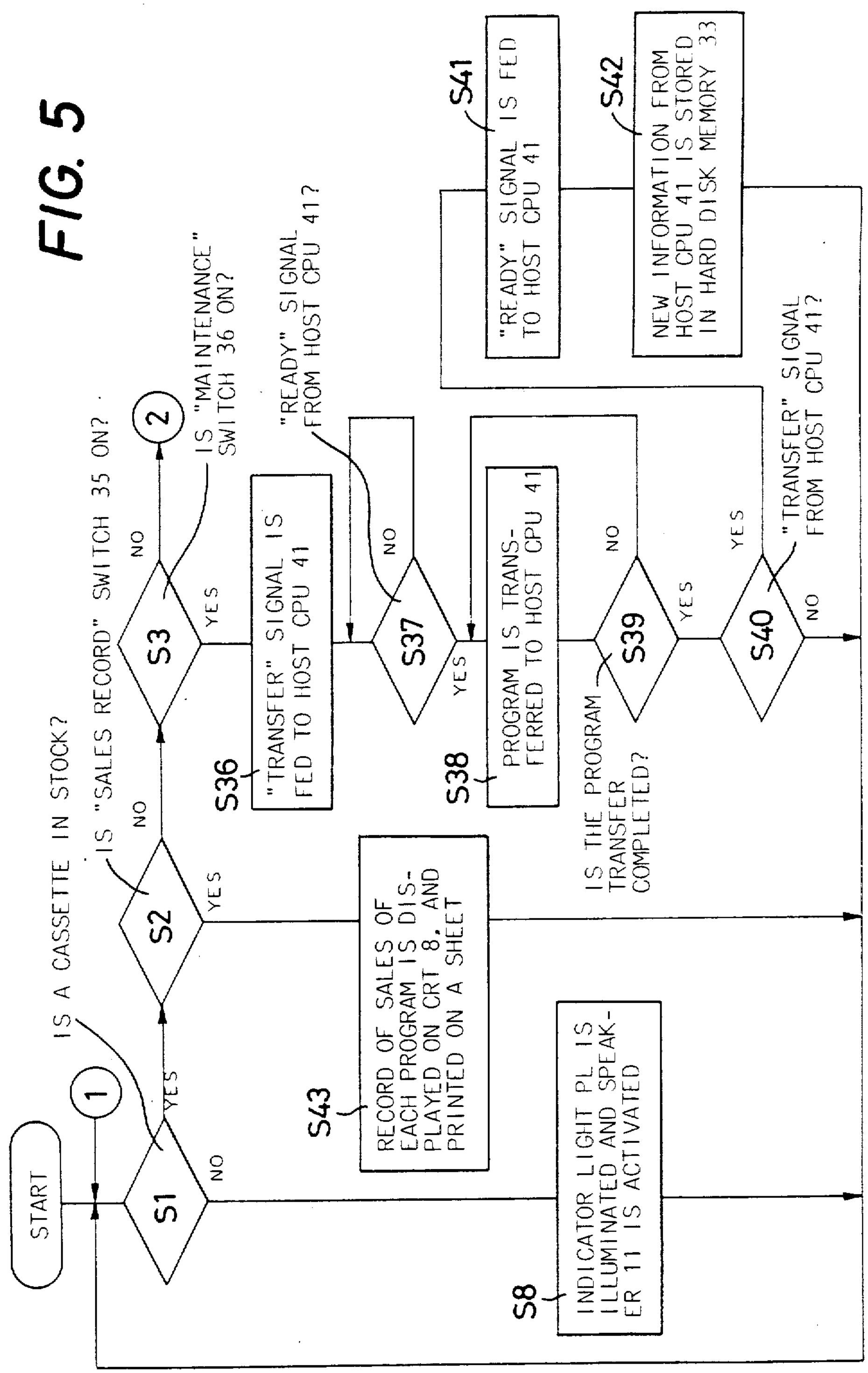
FIGS. 5-7 are flow charts showing the operation of first and second central processing units of the peripheral vending instrument.
Figure 6:
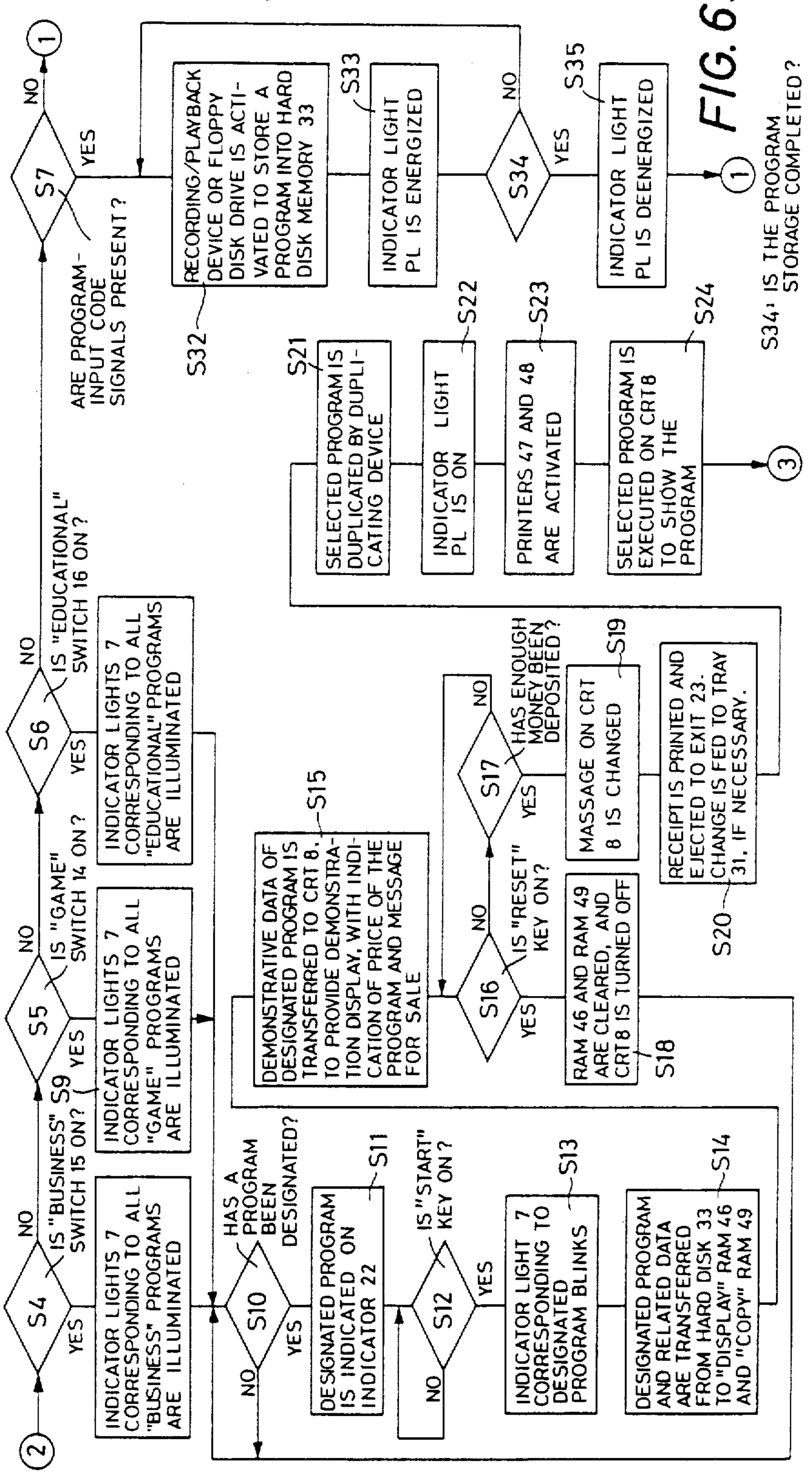
Figure 7:
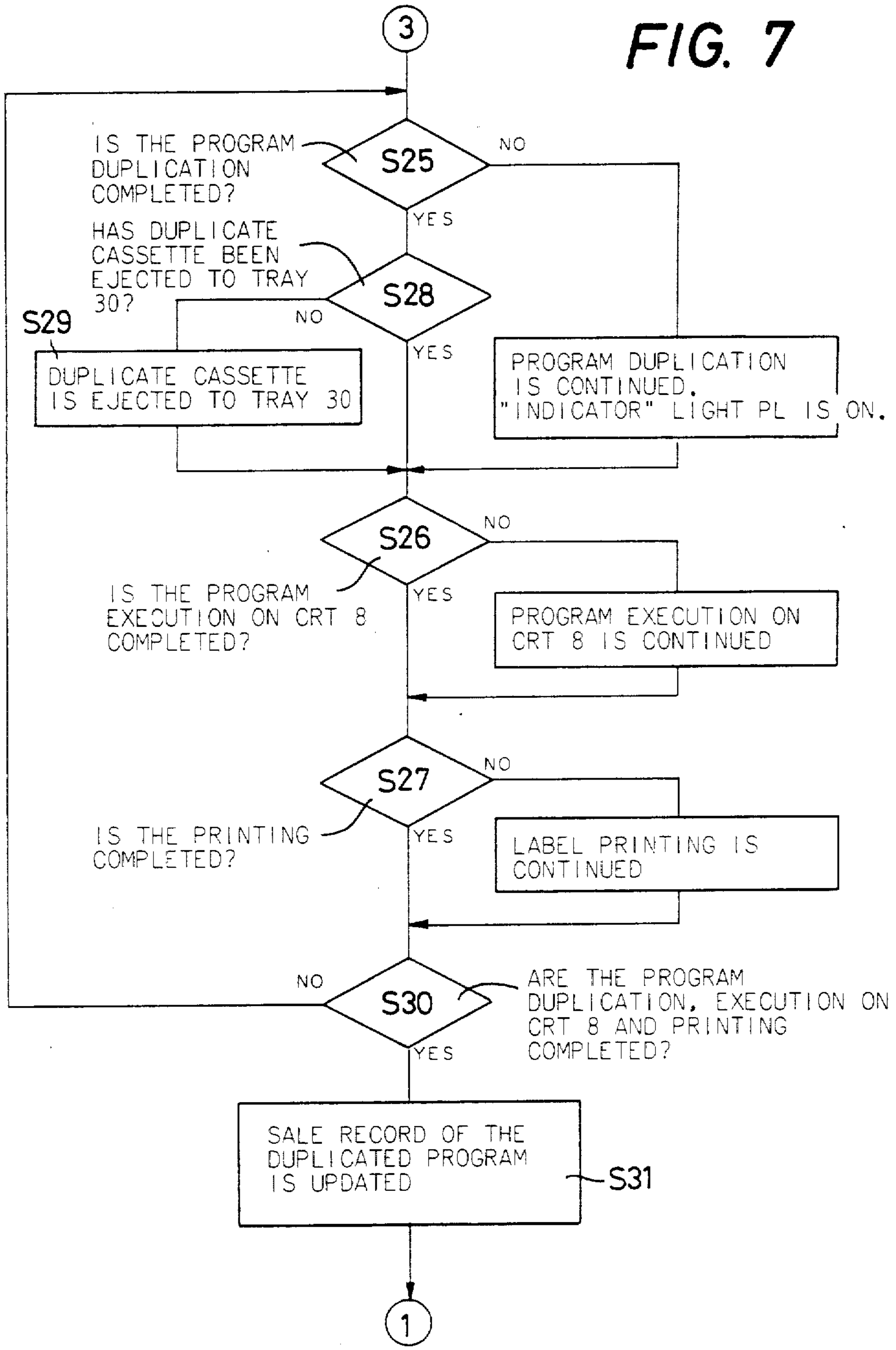

Referring to flow charts of FIGS. 5–7 illustrating the sequence of control of the first and second CPUs 44 and 50, there will be described the operation of the vending instrument 1 which is constructed as described hitherto. For easier understanding, steps of operations are numbered in the flow charts, and the step numbers preceded by letter S are referred to in the following description.

Normally, the hard disk memory 33 of the vending instrument 1 stores the software programs which have been transferred from the magnetic disk memory 45 of the host system 2 and which are exhibited on the display panel 4. Upon application of power to the instrument 1, the first CPU 44 checks, based on the signal from the cassette detector 52, to see if the blank tape cassette 25 is in stock or not (S1). Then, the first CPU 44 checks if the SALES RECORD switch 35 or MAINTENANCE switch 36 has been activated (S2, S3), and checks if the BUSINESS, GAME or EDUCATIONAL selector switch 15, 14, 16 has been turned on (S4, S5, S6). Subsequently, the first CPU 44 checks for the presence of program-input code signals such as passwords, identification codes and registration codes which are entered when a previously described user-developed software program is entered into the instrument 1 by use of the Ten-keys 10 in the predetermined manner (S7).

In the case where no blank tape cassette 25 is stored in the instrument 1, the first CPU 44 causes the indicator light PL to be energized, and the speaker 11 to be activated to generate an alarm sound (S8), so that the instrument 1 is charged with a new stock of the blank tape cassette 25.

When the purchaser depresses the GAME selector key 14 (S5) to buy a GAME program for a video game, for example, the first CPU 44 operates as indicated in FIG. 6. At first, the first CPU 44 activates the group of the program indicator lights 7 which corresponds to the GAME programs, whereby the appropriate program representations 5 of the GAME programs are illuminated on the display panel 4 (S9).

Then, the first CPU 44 checks if any program has been designated or selected with the Ten-keys 10 (S10). Upon entry of a serial number of a desired one of the GAME programs whose representations 5 are illuminated by the energized indicator lights 7, the serial number of the designataed program is indicated on the indicator 22 (S11), and the first CPU 44 waits for the activation of the START key 12 (S12). In response to an ON signal generated from the START key 12, the first CPU 44 causes only the program indicator light 7 corresponding to the designated program (serial number), to blink or flicker (S13). In the meantime, the first CPU 44 reads out the designated program and its related printing data (for the instruction sheet and the label 27 on the cassette 25) from the hard disk memory 33, and transfers these program and data to the PROGRAM DISPLAY RAM 46 and to the PROGRAM COPY RAM 49 (S14).

Upon completion of the data transfer to the RAMs 46, 49, the first CPU 44 retrieves from the PROGRAM DISPLAY RAM 46 demonstration data of the transferred designated program. The demonstration data represents an abstract of the subject matter of the designated program, e.g., abstract views of a video game. According to the retrieved demonstration data, demonstration images are provided on the screen of the CRT 8 (S15). Simultaneously, the price data of the designated program is retrieved from the hard disk memory 33, to cause the CRT 8 to indicate a selling price of the designated program (S16). In addition, a message is provided on the CRT 8 to instruct the purchaser to deposite money if the purchaser wishes to buy the demonstrated program (S16).

Thus, the purchaser is able to decide whether to buy the designated program, observing the demonstration images and the selling price of the program provided on the CRT 8.

The first CPU 44 then checks to see if the RESET key 13 has been turned on (S16) or if enough money has been deposited (S17). If the purchaser depresses the RESET key 12 to cancel the designated program, the first CPU 44 clears the PROGRAM DISPLAY RAM 46 and the PROGRAM COPY RAM 49, removes the display from the CRT 8, and stops the flickering action of the indicator light 7 corresponding to the designated program (S18). Then, the first CPU 44 becomes ready to accept the input of a serial number of another program (S10).

On the other hand, when the purchaser deposits a cash through the paper-money inlet 19 and/or the coin slots 20, 21, the first CPU 44 compares the "deposite" data from the counter 55, with the price data which has been retrieved from the hard disk memory 33, to check if enough money has been deposited (S17). If the sum of the deposited cash is equal to or larger than the selling price of the designated program, the first CPU 44 changes the current message on the CRT 8 to a message indicating the completion of the payment for the program (S19). The first CPU 44 activates the receipt printer 56 to print out a receipt, which is then fed to the receipt exit 23 (S20). If the comparison of the "deposit" data with the price data indicates an overpayment, the appropriate amount of change is returned through the change tray 31 (S20).

In the meantime, the first CPU 44 applies a COPY START signal to the second CPU 50. In response to the COPY START signal, the second CPU 50 retrieves the designated program from the PROGRAM COPY RAM 49, and operates the automatic duplicating device 51 to duplicate the retrieved program in the blank tape cassette 25 (S21). As soon as the duplication of the program in the cassette 25 has been initiated, the first CPU 44 energizes the indicator light PL (S22) to inform the purchaser that the duplication of the designated program is in progress.

After the indicator light 22 has been energized, the first CPU 44 retrieves the label printing data from the PROGRAM DISPLAY RAM 46, and operates the label printer 44 to print the title of the program, i.e., to prepare the label 27 with the imprint 26 (S23). At the same time, the first CPU 44 retrieves the printing data for the instruction sheet, and operates the instruction-sheet printer 47, according to the retrieved data, to prepare the instruction sheet for the program under duplication (S23).

During the duplication of the program by the duplicating device 51, the program stored in the PROGRAM DISPLAY RAM 46 is executed on the CRT 8 to show the contents of the program (S24). For example, if the selected program is a GAME program, the corresponding video game is played or animated on the CRT 8. thus, the purchaser may enjoy and/or confirm the game played on the CRT, and therefore does not feel bored while the program is being copied.

While the program is duplicated with its concurrent execution on the CRT 8, and while the instruction sheet and the label are printed, the first CPU 44 continuously checks: if the program duplication into the cassette 25 is completed or not (S25 - FIG. 7); if the execution of the program on the CRT 8 is completed (S26); and if the printing of the manual and label is completed (S27).

Upon completion of the program duplication, the second CPU checks if the recorded tape cassette 25 has been ejected to the cassette tray 30 (S28). If the cassette 25 has not been ejected, the second CPU 50 directs the duplicating device 51 to eject the recorded tape cassette 25 to the tray 30 (S29).

When the first CPU 44 has confirmed that the recorded tape cassette 25 and the printed label 27 have been delivered to the tray 30 and exit 47*a*, and that the execution on the CRT 8 has ended (S30), the sales record of the duplicated program is updated (S31). Described in more detail, the current number of sales of the program which was recorded with the dates of sale in the hard disk memory 33, is incremented by one to record the instant sale of the program (S31). Now, the first CPU 44 is ready to accept the next data entry by the purchaser or the owner of the instrument 1.

In the event that the vending instrument 1 has failed to normally operate, or a program duplication error or other operational trouble of minor nature has taken place, such operational trouble is recorded as maintenance DATA in the appropriate memory area of the hard disk memory 33. That is, the first CPU 44 records the contents of the trouble and updates the number of the trouble which has occurred.

The following description refers to a procedure in which a software program developed or designed by a software maniac, amateur fan or any other person (referred to as the user of the instriment 1) may be transmitted from the instrument 1 to the host system 2, for consideration or evaluation of the program by the software supplier or distributor.

Initially, a tape cassette or floppy disk storing a user-developed software program is set in the recording/-playback device 24 or in the floppy disk drive 28 or 29.

Subsequently, necessary program-input codes such as a program identification code and a user registration code are entered through the Ten-keys 10. Upon receipt of these program-input code signals (S7), the first CPU 44 activates the recording/playback device 24 or the floppy disk drive 28, 29 to store the program into the predetermined memory area of the hard disk memory 33 (S32), and energizes the indicator light PL (S33) to indicate that the program is being stored in the memory 33.

The first CPU 44 checks if the program in the tape cassette or floppy disk has been stored (S34). When the program has been stored, the first CPU 44 turns off the indicator light PL and goes back to steps S1-S7. Any operational error or trouble which has occurred during the above-indicated oepration is also recorded as maintenance data in the appropriate memory area of the hard disk memory 33 (and the maintenance data is thus updated).

To transfer the user-developed software programs stored in the hard disk memory 33 to the host system 2, the door 34 of the vending instrument 1 is opened and the MAINTENANCE switch 36 is turned on. This operation is carried out by the owner of the instrument 1, commonly at suitable intervals, for example, once a day (at the end of the business hour). In response to a signal from the MAINTENANCE switch 36 (S3), the first CPU 44 feeds a TRANSFER signal to the host CPU 41 (S36) to obtain a permit for transfer of the programs from the hard disk memory 33 to the host CPU 41. Then, the first CPU 44 checks to see if a "READY" signal has been generated from the host CPU 41 (S37).

In response to the "READY" signal from the host CPU 41, the first CPU 44 starts the transfer of the user-developed programs from the hard disk memory 33 to the host CPU 41 via the MODEM interfaces 43, 42 (S38). When the user-developed programs are transferred, the sales record data and maintenance data are also transferred from the hard disk memory 33 to the host CPU 41. The host CPU 41 which have received the program data, sales record data and maintenance data, transfers these data to appropriate memory areas of the the magnetic disk memory 45.

Therefore, the users who have developed software programs may easily forward and introduce their programs to a software supplier or distributor, by utilizing the peripheral vending instrument 1 of the vending system. On the other hand, the software supplier or distributor may readily gather the user-developed software programs. The gathered programs are easily retrieved from the magnetic disk memory 45, e.g., executed on the CRT 29 or printed out by the printer 37 for evaluation of the programs.

In addition, the sales record data and maintenance data transferred from the peripheral vending instruments 1 may be effectively used for preparing statistics of the sales of the individual software programs on sale, and of the various troubles of the peripheral instruments 1 such as program duplicating errors.

Upon completion of the data transfer from the hard disk memory 33 to the host system 2 (S39), the first CPU 44 checks if a "TRANSFER" signal has been generated from the host CPU 41 (S40). The presence of this "TRANSFER" signal from the host CPU 41 means that the host system 2 has new information or news that are to be transferred to the peripheral vending instruments 1. In the case where the "TRANSFER" signal is not generated from the host CPU 41, the first CPU 44 goes back to steps S1–S7, that is, waits for data input through the keys or switches. If the "TRANSFER" signal from the host CPU 41 is present, the first CPU 44 feeds a "READY" signal to the host CPU 41 (S41), and receives new information or news from the host CPU 41. The received information or news are stored in the appropriate memory areas of the hard disk memory 33 (S42). Now, the first CPU 44 is ready to accept any data input (S1–S7).

In the case where a software program or programs on sale on the peripheral vending instruments 1 are replaced by new programs, for example, by user-developed programs, these programs and the related data (printing data for the instruction sheets and labels, and price data) are transmitted from the host system 2 to the appropriate memory areas of the hard disk memory 33 when the new information or news are tranferred to the individual instruments 1 as discussed above.

When the owner of the vending instrument 1 wishes to know the number of sale of the individual programs on sale, the SALES RECORD switch 35 is turned on (S2). In this case, the first CPU 44 retrieves the sales record data from the hard disk memory 33, and operates the CRT 8 and the receipt printer 56 (S43). More specifically, the CRT 8 displays the number of sale of each program, together with the dates of sale (year, month and day), and the receipt printer 56 produces a hard copy of the sale records. The first CPU 44 then goes back to steps S1–7.

While the present invention has been described in its preferred embodiment, it is to be understood that the invention is not confined to the precise disclosure of the illustrated embodiment, but various changes, modifications and improvements may be made in the invention without departing from the spirit and scope of the invention defined in the appended claims.

What is claimed is:

1. A software vending system comprising:

a host system including first memory means for storing a plurality of different first software programs; and a plurality of peripheral vending instruments each operatively connected to said host system for interactive data communication therebetween, each of said peripheral vending instruments including secondary memory means for storing said first software programs transferred from said first memory means of the host system, and recording means for duplicating in a recording medium a selected one of said first software programs stored in said secondary memory means, said each peripheral vending instrument further including an input device for entering a second software program into the vending instrument, and data transmitting means for transferring to said host system said second software program entered through said input device, said host system including data receiving means for receiving said second software program transferred from said data transmitting means of said each peripheral vending instrument, said host system further including second memory means for storing said second software program received by said data receiving means.

2. A software vending system as recited in claim 1, wherein said input device comprises a device for reading said second software program in a tape cassette.

3. A software vending system as recited in claim 1, wherein said input device comprises a floppy disk drive for reading said second software program in a floppy disk.

4. A software vending system as recited in claim 1, wherein said each peripheral vending instrument comprises a central processing unit which incorporates said data transmitting means.

5. A software vending system as recited in claim 4, wherein said central processing means stores in a memory said second software program which is entered through said input device.

6. A software vending system as recited in claim 5, wherein said memory is said secondary memory means.

7. A software vending system as recited in claim 5, wherein said each peripheral vending instrument has a switch connected to said central processing means, said data transmitting means transferring said second software program to said data receiving means of the host system in response to the operation of said switch, if said second software program has been stored in said memory.

8. A software vending system as recited in claim 1, wherein said host system comprises an output device for retrieving said second software program from said second memory means.

9. A software vending system as recited in claim 8, wherein said output device includes a cathode ray tube.

10. A software vending system as recited in claim 8, wherein said output device includes a printer.

* * * * *